United States Patent [19]
Artz

[11] 3,756,266
[45] Sept. 4, 1973

[54] REMOVAL OF LIQUID FROM PIPE CARRYING GAS

[75] Inventor: Ernest Artz, West Chester, Pa.

[73] Assignee: SunOlin Chemical Company, Claymont, Del.

[22] Filed: Feb. 8, 1972

[21] Appl. No.: 224,536

[52] U.S. Cl............................ 137/203, 137/236
[51] Int. Cl................................................ F16t 1/00
[58] Field of Search................ 137/203, 204, 236; 134/167 C; 15/104.12

[56] References Cited
UNITED STATES PATENTS
1,191,013   7/1916   McGilvary.......................... 137/203
3,379,027   4/1968   Mowell.......................... 137/236 X
3,678,948   7/1972   Hedges........................... 134/167 C Primary Examiner—Alan Cohan
Attorney—George L. Church, Donald R. Johnson et al.

[57] ABSTRACT

Extraneous liquid which accumulates as a body at the low point of a large-diameter pipeline carrying gas under pressure is removed by utilizing the gas pressure to force the liquid out through a small-diameter line which is sealed through the wall of the large line and whose bore communicates with the interior of the large line at such low point. The small line is preferably positioned inside the large line, and means is provided for inserting the small line into an existing large line, from one end thereof.

5 Claims, 5 Drawing Figures

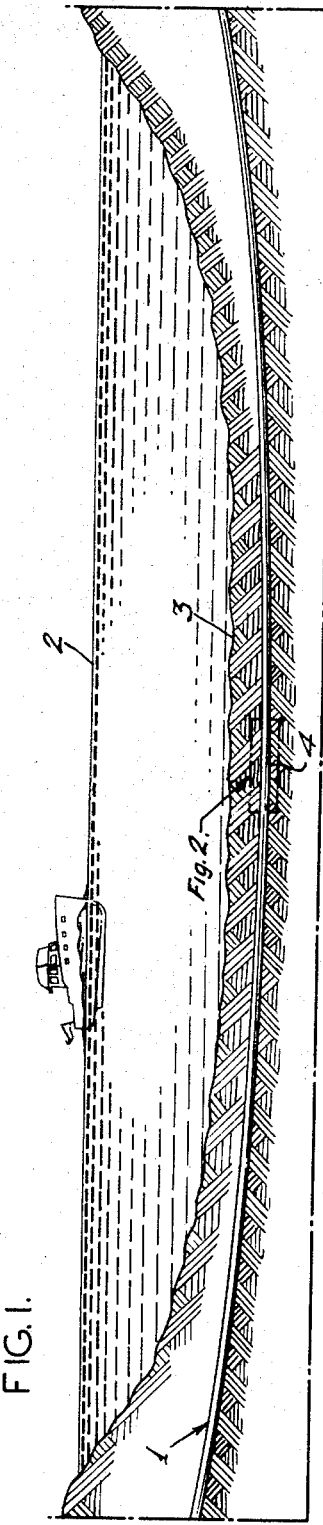
FIG. I.
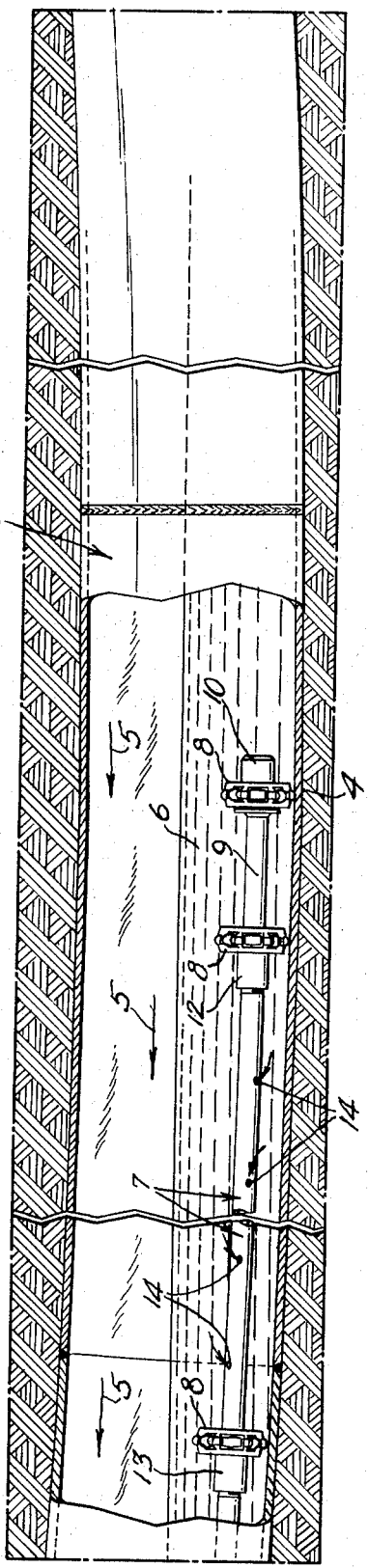
FIG. 2.
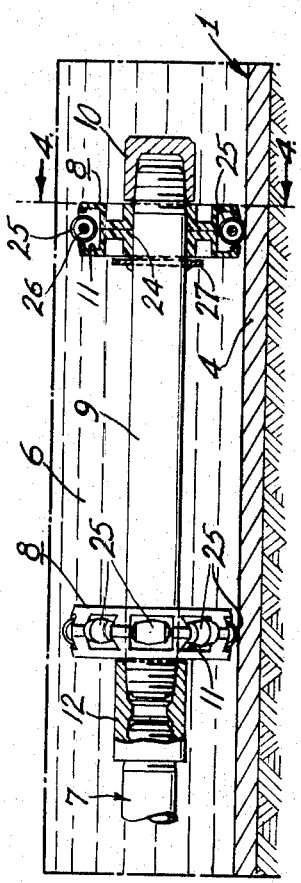
FIG. 3.

REMOVAL OF LIQUID FROM PIPE CARRYING GAS

This invention relates to the removal of a liquid such as water from a pipeline which is employed to carry gas under pressure from one location to another. It has particular utility in connection with pipelines of large diameter, on the order of sixteen inches, for example.

At times, and under certain conditions, hydrocarbon gases produced in a petroleum refinery may be "wet," that is, they may have entrained therein an appreciable quantity of water in the form of water vapor. When such "wet" gases are transmitted for considerable distances under pressure through a large-diameter line, the water "drops out" (which is to say, changes to a liquid) and accumulates as a body of liquid at the low point in the line. Eventually, this water body can build up to a level such as to markedly reduce the flow of gas through the line, or to cut it off altogether. When this occurs, the water must be removed from the line in order to restore it to effective operating condition.

One possible way to remove the water would be to remove the large line from service, open it, insert a pig, and run the latter through the line to swab the water out of the same. However, this is a time-consuming, expensive procedure.

An object of this invention is to provide a pipe arrangement for removing liquid from a pip carrying gas under pressure.

Another object is to provide an economical arrangement for removing liquid from a large-diameter gas pipeline.

A further object is to provide an arrangement for removing liquid from a pipeline carrying pressured gas, which functions as a permanent installation, whereby liquid may be withdrawn from the line whenever necessary, without removing the same from service.

A still further object is to provide a liquid-removal arrangement for a gas line which can be readily installed in an existing line.

The objects of this invention are accomplished, briefly, in the following manner: A pipe, whose diameter is small compared to that of the main line, is positioned inside a main large-diameter pipeline carrying pressured gas, the small pipe being sealed through one end of the large line and extending to the low point of the latter, at which point the bore of the small pipe communicates with the interior of the large line. A shutoff valve is coupled to the outer end of the small pipe, outside of the large line. The small pipe may be provided with rollers which enable it to be pushed into an existing large line, from one end thereof.

A detailed description of the invention follows, taken in conjunction with the accompanying drawings, wherein:

FIG. 1 is a diagrammatic view showing a portion of a large-diameter gas pipeline embodying the invention in place beneath a body of water;

FIG. 2 is a cross-section on an enlarged scale of the central portion of the pipeline of FIG. 1;

FIG. 3 is a partial cross-section, on a still larger scale, of a portion of FIG. 2;

Figure 4:
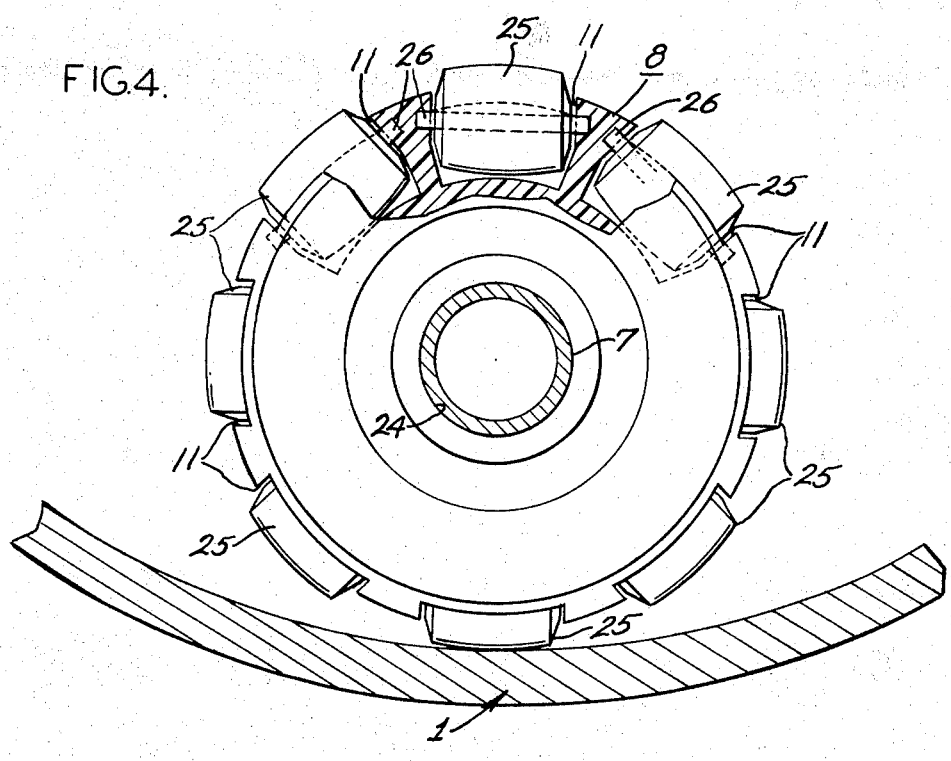
FIG. 4 is a sectional view (on an enlarged scale) taken along line 4—4 of FIG. 3.

Referring first to FIGS. 1 and 2, a large diameter pipeline 1 (16 inches in diameter, by way of example) is illustrated as crossing a river 2, the line being buried in a trench in the river bed 3. The line has a low point 4 which is at a known location near the middle of the river. By way of example, in a typical (and actual) embodiment, pipe 1 is buried under the Delaware River 2, and the low point 4 is known to be about 2,100 feet from the left bank or Delaware side of the River.

The line 1 is adapted to transport pressured gas in the direction of the arrows denoted by numeral 5, from right to left in FIG. 2. Continuing with the example of an actual embodiment, the pressured gas being transported may be a hydrocarbon gas produced by a petroleum refinery on the New Jersey side of the River and destined for a customer on the Delaware side of the River. The gas coming out of the refinery may be "wet," that is, it may have water vapor entrained therein. When the pressured gas, originally flowing through a line of smaller diameter, reaches the right-hand end of the large-diameter line 1 and begins to flow through this line, the entrained water "drops out," which is to say that it reverts to liquid phase, and flows down the line 1 to the low point 4 thereof, where it accumulates as a liquid body 6. If allowed to continue unchecked or unabated, the liquid body 6 would eventually enlarge to such an extent as to appreciably reduce the flow of gas through pipe 1, and perhaps even to block it off completely. This invention provides an arrangement for removing or withdrawing the liquid from pipeline 1, in a periodic fashion, so as to prevent the occurrence of this undesirable consequence.

According to this invention, a pipe 7, of small diameter compared to that of the main line 1 (for example, pipe 7 may have a diameter of three-fourths inch), is positioned inside the line 1, pipe 7 being sealed through one end of the large line 1 (as will be described later, in connection with FIG. 5) and extending from this one end to the low point 4 of line 1. Line 7 is supported inside the large line 1 by means of a plurality of roller units 8 spaced at intervals along the pipe or tube 7, as will later be detailed; these roller units enable the pipe 7 to be inserted or pushed into the large pipe 1.

As previously stated, the inner end of pipe 7 is located at the known low point 4 of line 1 (see FIG. 1). The innermost section of line 7 preferably comprises a pipe nipple 9 twelve inches long, to the free end of which is threaded a pipe cap 10 rounded off at its outer edge. The opposite end of nipple 9 is joined by means of a threaded coupling 12 to one end of the first full length of pipe 7, the remainder of the line 7 then comprising full lengths of pipe joined by means of threaded couplings such as 13. A series of longitudinally spaced holes 14 are drilled through the walls of the first two (innermost two) regular lengths of pipe 7 (about 40 feet total length), to provide communication between the bore of pipe 7 and the interior of pipe 1, in the region of the low point 4 of this latter pipe. Holes 14 may be each three-sixteenths inch in diameter, equally spaced 6 inches center to center, and arranged in a 360° spiral pattern around pipe 7. The end holes 14 in these two lengths of pipe are preferably spaced six inches from the adjacent couplings such as 12 and 13.

Figure 5:
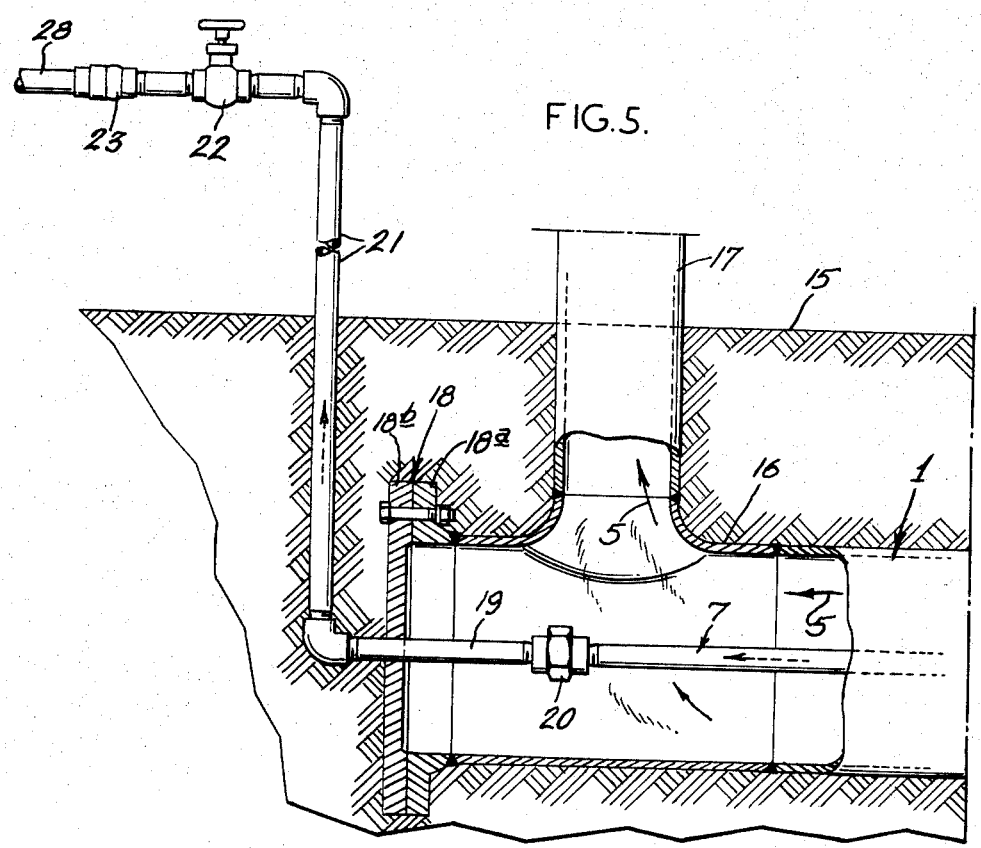
FIG. 5 is a diagrammatic view, partly broken away, illustrating the piping at one end of the line of FIG. 1.

Refer now to FIG. 5. At the left-hand (in FIG. 1) or Delaware end (terminal) of the large line 1, below grade 15, a welded tee fitting 16 is utilized to couple the end of pipe 1 to a branch pipe 17 of smaller diameter (6 inches, for example), by means of which the pressured gas flowing through line 1 is carried to a utilization point above grade 15. A blind flange 18, consisting of two elements 18a and 18b which are detachably fastened together in a conventional manner, is welded to the fitting 16 at the end thereof opposite the pipeline 1. A hole is drilled through the flange element 18b, and a short piece 19 of three-fourths inch pipe is welded into this hole and joined at its inner end by means of a threaded union 20 to the outer end of pipe 7. In this way, the small line 7 is sealed through one end of the large line 1, and the outer end of line 7 is also anchored to the large pipe. Outside of flange 18 and of line 1, the small-diameter line 7 is extended above grade 15 by means of a piece 21 of three-fourths inch pipe. A manually operable shutoff valve 22, for example a threaded gate valve, is connected to the outer end of the line 7, above grade, and a three-fourths inch hose coupling 23 is connected to the outlet side of valve 22. A hose 28 for water disposal, leading to a suitable water disposal means such as a sewer, is coupled by means of coupling 23 to the outer end of pipe 7 (outlet side of valve 22). the valve The structure described constitutes a semi-permanent arrangement for removing, drawing off, or withdrawing liquid from the large pipe 1. As described, the inner end of the small pipe 7 communicates (by way of holes 14) with the liquid body 6, at the low point 4 of pipeline 1, and the outer end of pipe or tube 7 communicates by way of valve 22 with a water disposal means. Water can be drawn off from the large pipe 1 through the small pipe, whenever this becomes desirable, merely by opening the valve 22. When this valve is opened, the pressure of the gas in line 1 forces the water out through the small pipe 7. In the actual embodiment previously referred to (for withdrawing liquid from a large-diameter gas pipe under the Delaware River), the water which had (prior to the installation of the pipe 7) accumulated in the pipeline 1, amounting to about 20,000 gallons, was drawn off through the pipe 7 and valve 22 in about three days.

It was previously indicated that it is feasible to insert the small pipeline 7 into an existing large line, from one end of the latter to the known low point thereof, so that a semi-permanent installation (for water removal) as described above can be provided. The roller units 8 are used to facilitate the insertion of the long string (on the order of 2,100 feet of length for example) of small pipe 7 into the large pipe 1, from one end of the latter. The roller units 8 enable such insertion to be carried out without risk of impediment by the small pipe becoming hung up due to abutting something (e.g., welding burrs) within the large pipe, or without risk of the small pipe folding inside the large pipe.

Refer now to FIGS. 3 and 4. Each of the roller units 8 is in the shape of a wheel having a central bore 24 (1 1/16 inches I.D.) which enables the units to be mounted on the outside of the pipe 7, the circular form of the wheel extending generally transversely to the axis of pipe 7. The roller unit 8 has eight rollers 25 circumferentially spaced at equal intervals around its periphery, these rollers being located essentially transversely with respect to the axis of pipe 7. The rollers 25 are substantially cylindrical in shape and are each mounted for free, individual rotation on a separate metal shaft or pin 26, all of which shafts are secured in the wheel body. The shafts 26 together extend approximately circumferentially of the wheel-shaped body of the roller unit. The rollers 25, which are made of a hard thermoplastic material, are mounted within a molded hard thermoplastic frame (the body of the wheel) having spaed, peripheral spaced, 11 one for each respective roller, the recess boundaries thus limiting lengthwise movement of the separate rollers Thus, the rollers 25 are maintained in proper spaced relation around the periphery of the roller unit. The roller surfaces extend radially outwardly beyond the frame containing them. When these roller units 8 are mounted on the pipe 7, a bearing surface (roller bearing surface) is presented (for engagement with the inner surface of pipe 1) regardless of any rotation of the small pipe 7 within the large pipe. The roller units 8 are sold under the trademark "Transwheel" by Kornylak Corporation of Hamilton, Ohio.

A first roller unit 8 is mounted on the forward end of pipe nipple 9, between cap 10 and a washer 27 (one inch I.D.) which is welded to the outside of this pipe nipple. Cap 10 and washer 27 maintain the roller unit 8 (the bore 24 of which slips over the outside of pipe nipple 9, with a small clearance) in position, longitudinally of the nipple. Other roller units 8 are slipped over the outside of pipe 7, one forwardly of each respective threaded coupling such as 12 and 13. Thus, as the small pipe 7 is pushed to the right in FIGS. 2 and 3 (and to the right in FIG. 1, toward the low point 4 of the large pipe 1), the roller units 8 are prevented from moving backwards along pipe 7 by the respective couplings 12, 13, and the pipe string 7 is provided with rolling means which enables such string to roll along and be supported by the bottom portion of the inner wall of the large pipe 1, as it is pushed into the large pipe.

In the actual embodiment which was put into practice, four men assembled and inserted (pushed) into the large pipe 1, in two days, a 2,100-foot string of three-fourths inch pipe (pipe 7), with each length of pipe 7 (about 20 feet) containing a roller unit 8 as described.

When the pipe 7 has been fully inserted, such that the forward end thereof is at the known location of the low point 4 of pipe 1, the installation of the small pipe is completed by coupling up the union 20, the sealed-through piece of pipe 19, pipe 21, the valve 22, etc., all as previously described.

The invention claimed is:

1. In combination, a main pipeline of extended length and varying elevation employed for the transportation of gases under pressure, said line having therein a low point at which liquid entrained in the gases may accumulate, the location of said line low point being known; a tube of small diameter, compared to that of said main line, sealed permanently into the interior of said pipe at a location adjacent one end thereof, said tube extending from said one end substantially parallel to the axis of said pipe and communicating at its inner end with the interior of said pipe at said line low point; and means coupled to the outer end of said tube, outside of said main line, for controlling the flow of liquid through said tube.

2. Combination according to claim 1, wherein said means comprises a manually-operable shutoff valve connected to the outer end of said tube, at said one end of the line.

3. Combination of claim 1, wherein said tube is supported within said pipe by means of a roller mounted on said tube and engaging the inner wall of said pipe.

4. Combination of claim 1, wherein the communication between said tube and the interior of said pipe is effected by means of a plurality of longitudinally spaced holes in the wall of said tube, adjacent the inner end thereof.

5. Combination of claim 1, wherein the communication between said tube and the interior of said pipe is effected by means of a plurality of longitudinally-spaced holes in the wall of said tube, adjacent the inner end thereof, and wherein the said means comprises a manually operable shutoff valve connected to the outer end of said tube, at said one end of the line.

* * * * *